Patented Aug. 8, 1939

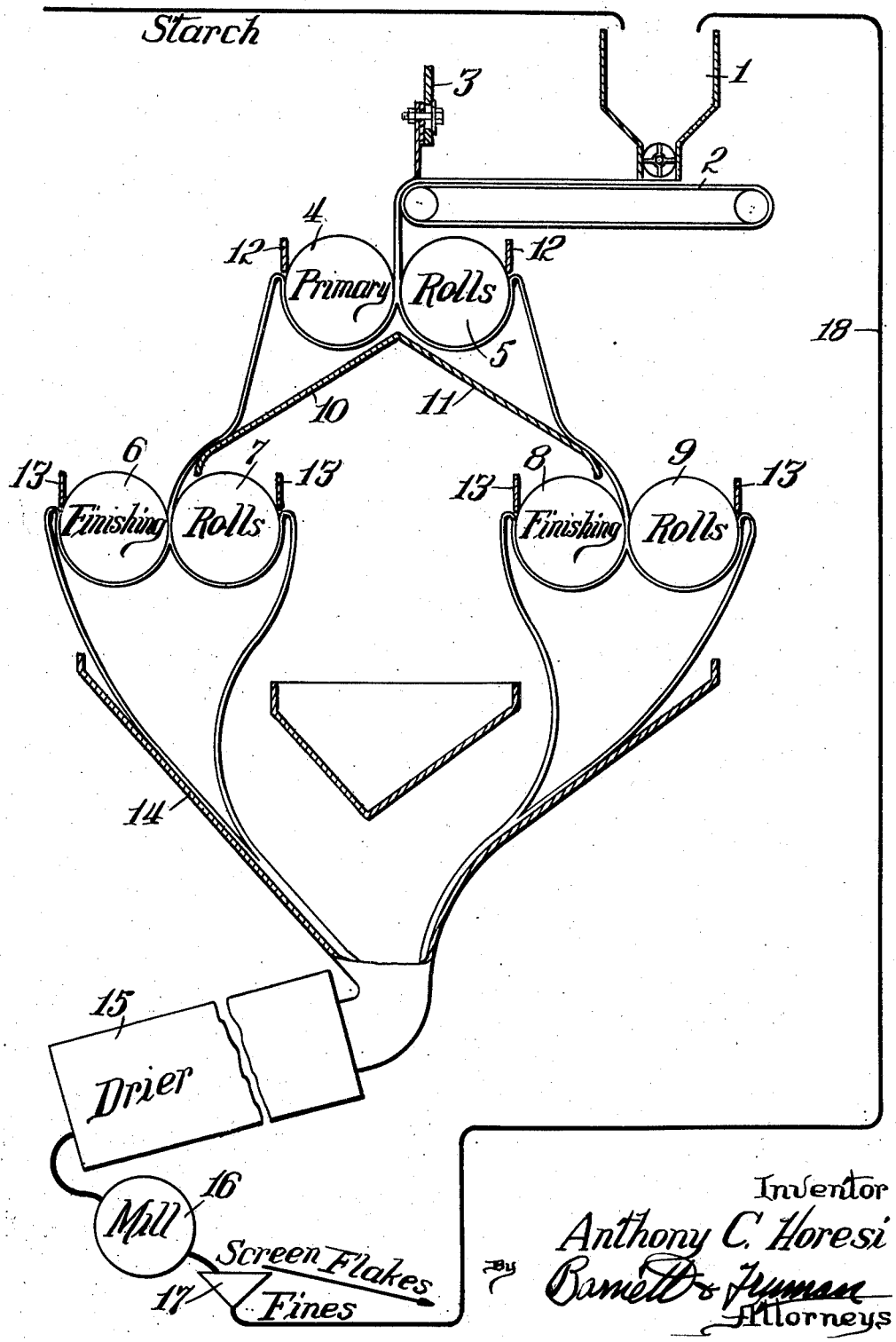

2,168,524

UNITED STATES PATENT OFFICE 2,168,524

METHOD OF TREATING STARCH

Anthony C. Horesi, Berwyn, Ill., assignor, by mesne assignments, to Corn Products Refining Company, New York, N. Y., a corporation of New Jersey Continuation of application Serial No. 26,397, June 13, 1935. This application September 21, 1936, Serial No. 101,802

8 Claims. (Cl. 127—32)

This invention relates to a method of treating starch in a moist condition to heat and pressure between rolls for the primary purpose of agglomerating the starch particles in the form of sheets which may thereafter be comminuted to form flake-like particles that are substantially dustless.

The principal object of the invention is to provide an improved method of and apparatus for producing the dustless grits or brewers' grits described and claimed in the application of Frederick L. Jefferies, filed July 18, 1934, Serial No. 735,742, now Patent No. 2,098,293, of November 9, 1937. This material consists of substantially pure starch, most of which is in a raw state, that is, with the starch granules intact, although possibly somewhat swollen, with a small portion gelatinized, that is, the starch cells disrupted and dispersed; the gelatinized starch serving to cement together the raw starch particles so that when the material which comes from the rolls has been dried and comminuted in the form of small particles and sifted to remove a relatively small quantity of fines it will be and remain, with ordinary handling, substantially dustless.

In accordance with the Jefferies application the moist starch is passed between the rolls of a single pair of hollow rolls set quite close together and heated by steam. The material adheres to the rolls in the form of two sheets which are stripped from the rolls, dried and then ground to the desired degree of fineness.

Some difficulty has been experienced in producing a satisfactory product, day in and day out, by the employment of this method. In passing moist starch between heated rolls the material is divided into two sheets, one adhering to one roll and the other to the other roll. The inner surface of each sheet is cooked to a greater extent than the outer surface and therefore one side of the sheet is gelatinized more than the other. This tends to produce gelatinized lumps in the grits if the rolls are set close together or the temperature of the rolls is high, while with reduced temperatures and/or pressures the gelatinization, confined as it is largely to one side of the sheet, may be insufficient to cement together the raw starch granules with the result that there is an excessive amount of dust and a friable condition in the grits which produces more dust when the material is handled. Gelatinized lumps are objectionable in a material intended for brewing as they resist the action of the malt enzymes. Equally objectionable is any appreciable amount of fine dust which may be carried into the air and by fermenting foul the brewery and which, so far as it remains with the grits, interferes to some extent with the proper wetting of the starch material in the malting tubs. The present process avoids these objections and makes it possible to produce economically, conveniently and in the regular operation of the process and without the considerable care and attention required by the Jefferies process, a starch product in the form of flakes or grits which will initially contain a minimum quantity of dust and the particles of which will be firm and coherent so as to resist breakage and dust formation when handled in the ordinary way.

Apparatus suitable for carrying out the improved process of the present invention is shown diagrammatically in the accompanying drawing, in which:

A feed hopper for the starch is designated 1, beneath which is arranged a belt conveyor 2 for conveying the starch to the primary rolls 4 and 5; 3 designating an adjustable gate for regulating the rate of feed. Arranged below the primary rolls are two pairs of finishing rolls 6, 7 and 8, 9. Guide plates 10, 11 are arranged to guide the sheets of material stripped from the primary rolls by the stripping blades 12 to the bights of the pairs of finishing rolls. The finishing rolls are also provided with stripping knives 13, and a collecting hopper 14 is arranged below the finishing rolls 6—9. The material is delivered by the hopper 14 to a suitable drier, for example a rotary drum drier indicated at 15. The dried material passes to a mill 16, the ground material from which is delivered to a screen 17 for separation of the fines from the grits or flakes, the fines preferably being returned by a suitable conveyor 18 to the hopper 1.

The primary rolls are set wide enough apart so that the sheets of material adhering to the rolls and stripped therefrom by the stripping blades 12 have a thickness of approximately $\frac{1}{16}$ of an inch. The rolls are hollow and heated, preferably, by steam under pressure. The steam pressure maintained in the primary rolls is preferably about fifty pounds per square inch, giving a superficial temperature of approximately 250° F. The pressure exerted by the rolls is sufficient at the roll temperature indicated to form the material into sheets sufficiently coherent, when stripped from the rolls, to be guided, substantially intact, to the finishing rolls. It is probable that the sides of the sheets which have been in contact with the primary rolls, before the sheets were stripped from the rolls, have formed thereon thin films of gelatinized starch which tend to give coherence to the sheets. The extent to which the sheets from the primary rolls are gelatinized will depend upon the temperature of the rolls and also to some extent upon the pressure which they are set to exert on the material.

The sheet of starch material stripped from the primary rolls 4 passes over the inclined guide 10 to the bight of the pair of finishing rolls 6 and 7; and, correspondingly, the sheet of material stripped from the primary roll 5 passes over the inclined guide 11 to the bight of the pair of finishing rolls 8 and 9. The material going to the finishing rolls is moist enough and soft enough so that the sheet will be split, for its whole width, in each case, half adhering to one finishing roll of the pair and the other half to the other finishing roll. Both surfaces of each of the sheets stripped from the primary rolls are brought into contact with the heated surfaces of the finishing rolls. These rolls are preferably set closer together than the primary rolls, and they are heated to a considerably higher temperature, for example by steam at 160 pounds pressure per square inch, which will give the rolls a superficial temperature of about 320° F. when the material is in contact therewith. The starch entering the bight of the primary rolls has, preferably, a moisture content of about 30%. The material is passed through the rolls at a rate of about 100 feet per minute. The rolls are all preferably 24 inches in diameter by 36 inches in length. The sheets stripped from the finishing rolls will have a thickness of about 0.046 inch which may vary from 0.024 to 0.074 inch. The smooth sides of the sheets from the finishing rolls, that is the sides which were in contact with the rolls, are filmed with gelatinized starch. The opposite or rough sides of the sheets, the sides formed by splitting by the finishing rolls of the sheets received from the primary rolls, are made up very largely of substantially raw starch the cell structure of which has not been destroyed or appreciably affected by the heat treatment, but these raw starch particles are effectively bonded together by films of gelatinized starch on the opposite, that is the roll sides, of the sheets. It is difficult to obtain this effective bonding of the raw starch by the gelatinized starch with a single pass through heated rolls without gelatinizing the starch to too great an extent and producing gelatinized lumps in the final flaked product. The stripping knives on all of the rolls are preferably set about 20° above the horizontal.

The material collected in hopper 14 will ordinarily contain more moisture than is desired in a commercial product. The material is therefore passed through drier 15 and is then comminuted, to the desired degree of fineness, in the mill 16. The milling develops only about 5 per cent of fines, with the process carried out as described. These fines are preferably run back to the feed hopper 1.

The flaked grits may have a moisture content of about 13%, the moisture content, however, being optional. They consist mostly of ungelatinized starch, the cell structure of which is intact, but there is enough gelatinized starch present to give the flakes or grits coherence and stability. The fact that the starch is only slightly modified is evident from the soluble content which may be in the neighborhood of 1 per cent by weight. The cold water absorption capacity is 5 parts water by weight to 1 part of the material.

It will be understood that the foregoing data are typical and informative and not to be considered as restricting the invention to these particulars. Temperatures, pressures, and water content may be varied to a considerable extent. The variations will ordinarily be reflected to some extent in the characteristics of the product. However, the best results in the manufacture of dustless flakes intended for brewers use are obtained by following the operating directions given above. The invention, however, is not limited to the production of this type of starch product; although the improved process is particularly suitable for making this product, because of the better control which it gives in the matter of degree of gelatinization of the starch and distribution of gelatinized and ungelatinized starch in the final product. The intention is to cover all equivalents of the described process, together with all modifications within the scope of the appended claims. This application is a continuation of copending application of Anthony Charles Horesi, Serial No. 26,397, filed June 13, 1935, for which it is to be substituted.

I claim:

1. Method of making dustless grits consisting of raw starch and a small quantity of gelatinized starch which method comprises: passing starch in a moist state, at the rate of about 100 feet per minute, between a pair of primary rolls internally heated with steam at about 50 pounds pressure per square inch and set apart to form the starch into coherent sheets adhering to the rolls having a thickness of about $\tfrac{1}{16}$ of an inch; stripping the sheets separately from the primary rolls and causing them to pass separately between finishing rolls heated to about 160 pounds pressure per square inch and set apart to form sheets about $^{46}/_{1000}$ of an inch thick; and stripping the material from the finishing rolls and drying and comminuting it.

2. Method of treating starch which comprises: passing starch in a moist state between heated primary rolls set close to one another to form relatively thin sheets of the starch which adhere to the rolls; stripping the material from the rolls and passing the material stripped from each roll separately between heated secondary rolls whereby the starch is at least partially gelatinized.

3. Method of treating starch which comprises: passing starch in a moist state between heated primary rolls set close to one another to form relatively thin sheets of the starch which adhere to the rolls; stripping the material from the rolls and passing the material stripped from each roll separately between secondary rolls heated to a higher temperature than the primary rolls, whereby the starch is at least partially gelatinized.

4. Method of treating starch which comprises: passing starch in a moist state between heated primary rolls set close to one another to form relatively thin sheets of the starch which adhere to the rolls; stripping the material from the rolls and passing the material stripped from each roll separately between secondary rolls which are set closer together than the primary rolls, whereby the starch is at least partially gelatinized.

5. Method of treating starch which comprises: passing starch in a moist state between heated primary rolls set close to one another to form relatively thin sheets of the starch which adhere to the rolls; stripping the material from the rolls and passing the material stripped from each roll separately between secondary rolls which are set closer together and are heated to a higher temperature than the primary rolls, whereby the starch is at least partially gelatinized.

6. Method of producing dustless flakes consisting of raw starch and a small quantity of gelatinized starch which comprises: passing starch in a moist state between heated primary rolls to form relatively thin sheets of the starch which adhere to the rolls; stripping the material from each of the primary rolls and passing it separately between secondary rolls set closer together than the primary rolls and heated to a higher temperature than the primary rolls, whereby enough of the starch is gelatinized to bring about adherence of the ungelatinized starch; and drying and comminuting the material into flake-like bodies.

7. Method of treating starch which comprises: passing the starch in a moist state between heated primary rolls; stripping the material from each of the primary rolls and passing it separately between secondary rolls set closer together and heated to a higher temperature than the primary rolls to bring about gelatinization of at least a part of the starch.

8. Apparatus for treating starch comprising in combination a pair of heated primary rolls; two pairs of heated finishing rolls; means for stripping the material separately from the primary rolls and conducting the material from one primary roll to the bight of one of the pairs of finishing rolls and the material from the other primary roll to the other pair of finishing rolls; and means for stripping the material from the secondary rolls.

ANTHONY C. HORESI.